(12) United States Patent
Maurer

(10) Patent No.: US 6,574,838 B2
(45) Date of Patent: Jun. 10, 2003

(54) TIE-DOWN DEVICE AND METHOD

(75) Inventor: Larry D. Maurer, Kansas City, MO (US)

(73) Assignee: Dedra Jo Moll, Kansas City, MO (US)

( * ) Notice: Subject to any disclaimer, the term of this patent is extended or adjusted under 35 U.S.C. 154(b) by 0 days.

(21) Appl. No.: 09/865,194

(22) Filed: May 23, 2001

(65) Prior Publication Data

US 2002/0032953 A1 Mar. 21, 2002

Related U.S. Application Data

(60) Provisional application No. 60/206,407, filed on May 23, 2000.

(51) Int. Cl.[7] .................... A44B 21/00; A44B 13/00; B65H 59/14; F16G 11/04
(52) U.S. Cl. .............. 24/136 R; 24/136 K; 24/115 M; 244/29; 188/65.4; 403/371
(58) Field of Search ................... 24/136 R, 136 K, 24/127, 115 M, 122.6, 700, 701; 174/79; 403/371; 248/63; 188/65.3, 65.4; 29/431; 114/273; 244/2, 25, 29; 59/78

(56) References Cited

U.S. PATENT DOCUMENTS

| | | | | |
|---|---|---|---|---|
| 460,859 A | * | 10/1891 | Gardner | 24/700 |
| 1,078,605 A | * | 11/1913 | Blackburn | 24/136 R |
| 1,546,430 A | * | 7/1925 | Blitz | 24/701 |
| 2,564,036 A | | 8/1951 | Siler | |
| 3,239,173 A | * | 3/1966 | Watkins | 248/63 |
| 3,257,499 A | * | 6/1966 | Broske | 174/79 |
| 3,698,047 A | * | 10/1972 | Pierce | 24/136 R |
| 3,757,901 A | | 9/1973 | Hobbs | |
| 4,019,609 A | | 4/1977 | Wagner | |
| 4,337,553 A | | 7/1982 | Fischer | |
| 4,830,340 A | | 5/1989 | Knitig | |
| 4,842,219 A | * | 6/1989 | Jakubowski et al. | 244/31 |
| 5,209,173 A | | 5/1993 | Shell | |
| 5,553,360 A | * | 9/1996 | Lucas et al. | 24/136 K |
| 5,803,439 A | * | 9/1998 | Gilmore | 707/74 |

* cited by examiner

Primary Examiner—Victor Sakran
(74) Attorney, Agent, or Firm—Allen, Dyer, Doppelt, Milbrath & Gilchrist, P.A.

(57) ABSTRACT

A tie-down device secures an aircraft to the ground. The tie-down device includes a hook and slide member operating within the hook to secure a line. In use the line passes through an aperture within the slide member for biasing against a bottom portion of the hook when an opposing end of the line is placed under tension pulling against a top portion of the hook and is used to secure an aircraft to a ground anchor. A second embodiment includes an elongated slide member replacing the wheel. The slide member includes an aperture for receiving the line therethrough and a groove along a peripheral portion for sliding engagement with the hook. In addition, the slide member includes a release arm, accessible to a user, for pulling against the tension holding the line in frictional contact against the bottom portion of the hook.

7 Claims, 4 Drawing Sheets

TIE-DOWN DEVICE AND METHOD

CROSS-REFERENCE TO RELATED APPLICATION

This application claims priority from copending provisional application Serial No. 60/206,407, filed May 23, 2000.

FIELD OF INVENTION

The present invention generally relates to tying devices and, more particularly, to a quick release tie-down device useful for securing a light aircraft to a ground support.

BACKGROUND

Problems associated with securing a light aircraft to the ground or tarmac at an outdoor storage location are well known in the art. In particular, problems associated with securing the aircraft and releasing it during adverse weather conditions necessitate difficult and lengthy procedures. There is a therefore a need to provide for ease in securing the light aircraft and ease in releasing it from its secured location in a timely manner regardless of weather conditions.

Several devices are known in the art for guiding and clamping a line and the like. By way of example, U.S. Pat. No. 3,757,901 to Hobbs discloses a rope brake having a frame with a closed opening for a nonreleasable attachment of a safety belt and rings as well as a flexible line wound within a slide member and brake bar within the brake device. U.S. Pat. No. 4,019,609 to Wagner discloses another brake apparatus for use in rappelling. U.S. Pat. No. 4,337,553 to Fischer is for an apparatus for guiding and clamping flexible ropes and U.S. Pat. No. 4,830,340 to Knitig is for a rope grip apparatus.

SUMMARY OF INVENTION

An object of the present invention is to provide a tie-down device for securing a portion of an aircraft to a retaining member.

Another object is to provide such a tie-down device for securing the aircraft portion to the ground.

An additional object is to provide such a tie-down device that is easier and quicker to use.

A further object is to provide such a tie-down device that can be used in adverse weather conditions.

Yet another object is to provide a method of using such a device.

These and other objects are achieved by the present invention, a tie-down device and method for securing a portion of an aircraft to a retaining member positioned, for example, on the ground. The tie-down device comprises a hook and slide member operating within the hook to secure a line. In use the line passes through an aperture within the slide member for biasing against a bottom portion of the hook when an opposing end of the line is placed under tension pulling against a top portion of the hook. The line then is used to secure an aircraft to a ground anchor.

A second embodiment of the aircraft tie-down device of the present invention comprises an elongated slide member replacing the wheel. The slide member includes an aperture for receiving the line therethrough and a groove along a peripheral portion for sliding engagement with the hook. In addition, the slide member includes a release arm, accessible to a user, for pulling against the tension holding the line in frictional contact against the bottom portion of the hook. The slide member release arm reduces friction on the line and permits the line to slide to a loosened position. A slight movement of the slide member allows the bitter end of the line to slip, sufficiently freeing the line for easy removal of the hook from the tie-down condition.

DETAILED DESCRIPTION OF THE PREFERRED EMBODIMENTS

A description of the preferred embodiments of the invention will now be presented with reference to FIGS. 1–8.

Figure 1:
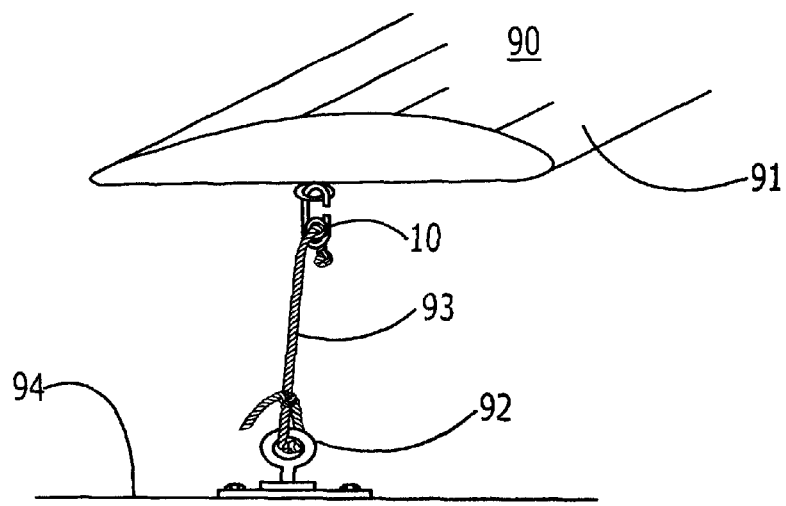
FIG. 1 is a side perspective view of a tie-down device used for securing an aircraft to a ground anchor.

As illustrated initially with reference to FIG. 1, the present invention includes an aircraft tie-down device 10 for securing a light aircraft 90, such as by a wing 91, to a ground anchor 92 by means of a tie-down line 93, allowing the aircraft 90 to be stored outdoors during varying weather conditions. The aircraft 90 may be tethered, for example, to the ground or tarmac 94.

Figure 2:
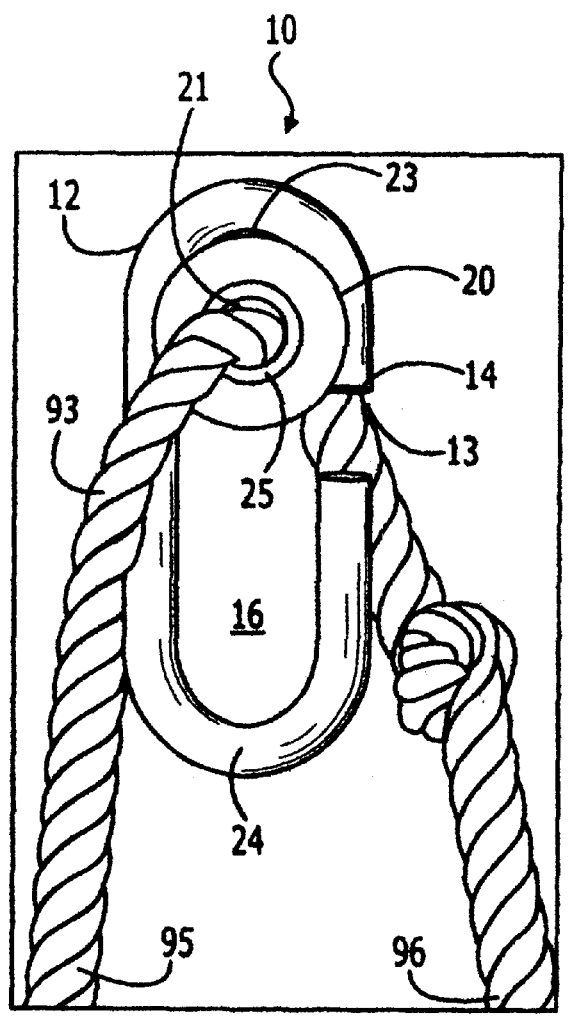
FIGS. 2–4 illustrate the use of the device, with FIG. 2 showing the feeding of a cord through the hook, FIG. 3 bringing the knotted end of the cord through the notch, and FIG. 4 locking the ring.
Figure 4:
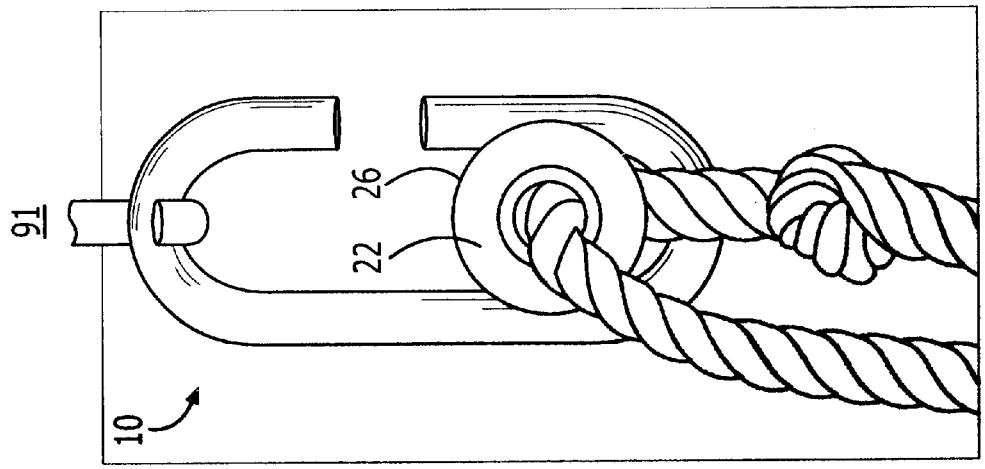
Figure 3:
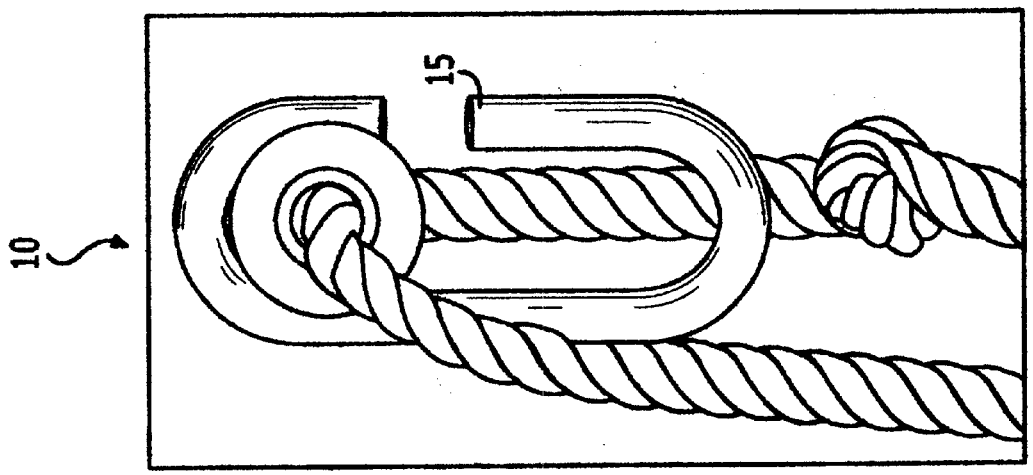
Figure 7:
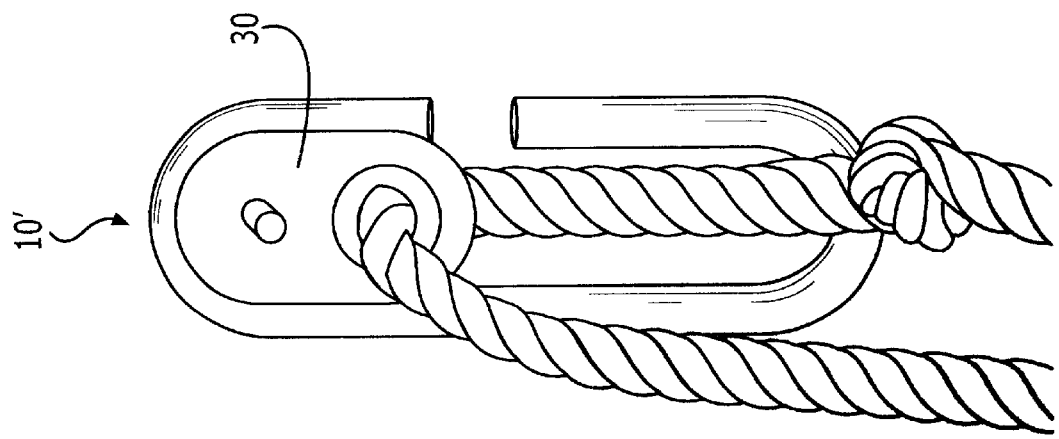
FIGS. 6–8 illustrate the use of the second embodiment, analogous to FIGS. 2–4.
Figure 6:
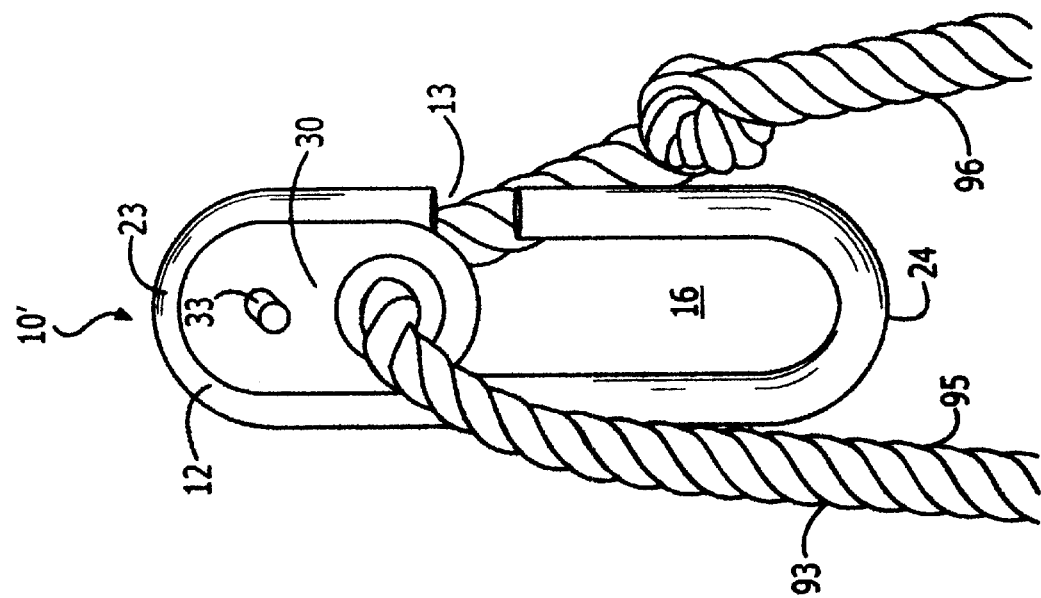
Figure 5:
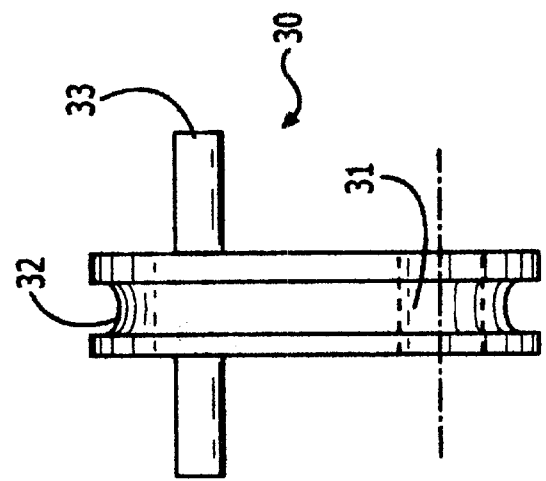
FIG. 5 is a side view of a release arm and slide member of a second embodiment of the device.

A first embodiment of the present invention includes a tie-down device 10 as illustrated with reference to FIGS. 2–4. The tie-down device 10 comprises a hook 12, comprising in a preferred embodiment a "C"-shaped member having an opening 13 between two ends 14,15 of the "C" and an interior space 16. The "C"-shaped member may comprise, for example, a generally cylindrical metallic rod material, such as, but not intended to be limited to, aluminum rod.

The device 10 further comprises a wheel 20 having an aperture 21 therethrough and a groove 22 around a periphery thereof. The wheel 20 exterior diameter is dimensioned larger than the width of the hook's interior space 16, and the groove 22 is dimensioned to slidingly engage the hook 12. Thus the wheel 20 is retained within the space 16 and can slide therewithin between, for example, an upper position (FIG. 2) adjacent the top portion 23 of the hook 12 and a lower position (FIG. 4) adjacent the bottom portion 24 of the hook 12.

In use to secure a line 93, a first end 95 of the line 93 passes through the wheel's aperture 21 from the rear face 26 to the front face 25 and further passes around the wheel 20 for biasing against the hook's bottom portion 24 when an opposing end 96 of the line 93 is placed under tension. Then the line 93 pulls against the hook's top portion 23, which may be secured to the aircraft 90 or ground anchor 92. As illustrated with reference again to FIGS. 2 and 3, to arrive at such an arrangement, the first, tension end 95 of the line 93 is passed through the wheel aperture 21 while the free end 96 of the line 93 is passed through the hook's opening 13 and positioned below the wheel 20 prior to applying tension for pulling against the wheel 20. Next the line 93 is placed against the free end 96 for securing it, as illustrated with reference again to FIG. 4. As a result, it is easy to manually secure the aircraft 90 to the ground 94 and release tension by pulling up on the bitter end 96 of the line 93 for forcing the wheel 20 away from the hook's bottom portion 24 and releasing a frictional contact of the bitter end 96. Reversing the securing process thus releases the device 10.

Figure 8:
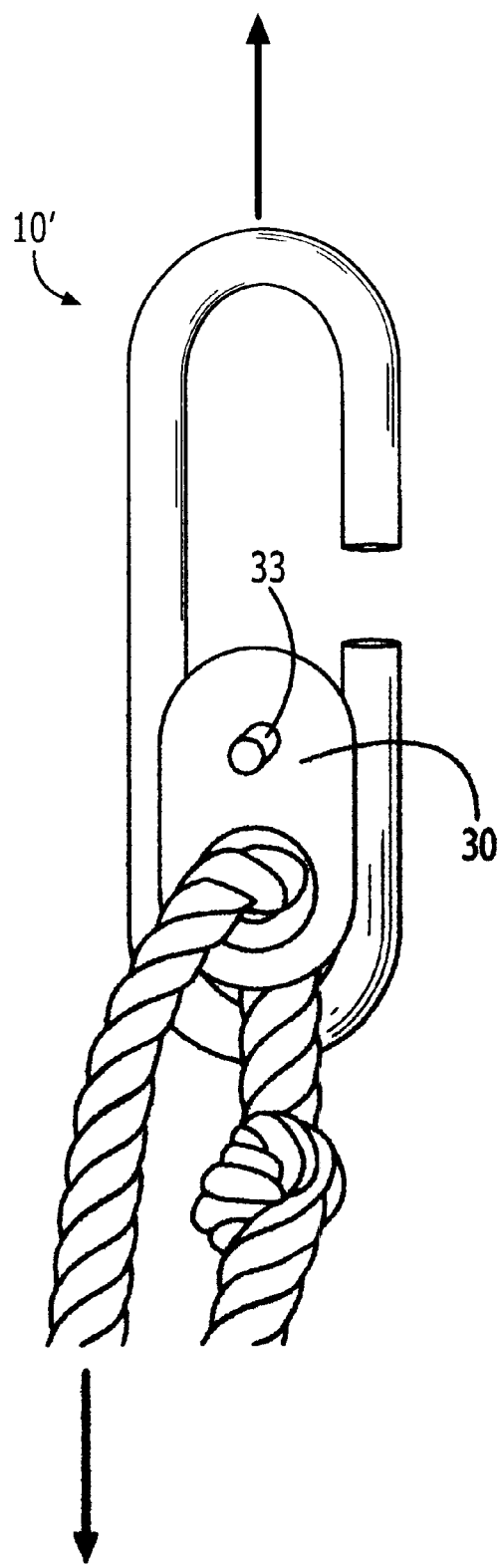

A second embodiment of the device 10' is illustrated with reference to FIGS. 5–8. This embodiment 10' of the present invention includes an elongate slide member 30 (FIG. 5) in place of the wheel 20 earlier described earlier with reference to FIGS. 2–4. The slide member 30 has an aperture 31 for receiving the line 93 therethrough, as earlier described for the wheel 93. The slide member 30 further includes a groove 32 along its peripheral portion. Again, the width of the slide member 30 is greater than the width of the hook's interior space 16, and the groove 32 is adapted to admit a portion of the hook 12 for sliding therealong between an upper position (FIG. 6) and a lower position (FIG. 8).

The slide member 30 also comprises a release arm 33 that extends outwardly therefrom. The arm 33 is positioned above the aperture 31 in this embodiment and is accessible to a user for pulling against the tension holding the line 93 in frictional contact against the bottom portion 24 of the hook 12. In operation, a slight movement of the slide member 30 allows the free end 96 of the line 93 to slip, sufficiently freeing the line 93 for easily removing the hook 12 from the tie-down condition.

It may be appreciated by one skilled in the art that additional embodiments may be contemplated, including devices having different orientations and proportions.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the device illustrated and described herein are by way of example, and the scope of the invention is not limited to the exact details of construction.

What is claimed is:

1. A method of tying down an aircraft comprising the steps of:

affixing a generally "C"-shaped sliding member to an aircraft, the "C"-shaped member having an opening between two ends thereof leading to an interior space;

passing a first end of a securing line through an aperture of a sliding member from a rear face to a front face thereof, the sliding member retained within an interior space of the "C"-shaped member;

passing a portion of the securing line extending from the sliding member rear face through the "C"-shaped member opening into the interior space and in front of the "C"-shaped member, with the sliding member in an upper position generally adjacent a top of the "C"-shaped member; and moving the sliding member from the upper position to a lower position generally adjacent a bottom portion of the "C"-shaped member to frictionally engage the securing line against the "C"-shaped member bottom portion.

2. The method recited in claim 1, wherein the "C"-shaped member is formed from a generally cylindrical rod-shaped material.

3. The method recited in claim 2, wherein the rod-shaped material comprises aluminum rod.

4. The method recited claim 1, wherein the sliding member comprises a generally wheel-shaped member having a groove around a periphery thereof dimensioned for slidingly engaging the "C"-shaped member and an exterior diameter larger than a width of the hook interior space.

5. The method recited in claim 1, wherein the sliding member comprises an elongate member having a groove around a periphery thereof dimensioned for slidingly engaging the sliding member and an exterior width larger than a width of the hook interior space.

6. The method recited in claim 5, wherein the elongate member further comprises a release arm extending from at least one of the front face and the rear face for moving the elongate member.

7. The method recited in claim 1, wherein the release arm extends from both the front face and the rear face.

* * * * *